United States Patent [19]

Mackey

[11] 3,933,516

[45] Jan. 20, 1976

[54] PHOTOGRAPHIC ELEMENT OF IMPROVED ANTISTATIC AND SLIPPAGE PROPERTIES CONTAINING CALCIUM STEARATE DISPERSION AND STEARAMIDO-PROPYL DIMETHYL-BETA-HYDROXY-ETHYL AMMONIUM NITRATE; GELATINOUS COMPOSITION, AND METHOD, FOR PREPARING SAID ELEMENT

[75] Inventor: E. Scudder Mackey, Binghamton, N.Y.

[73] Assignee: GAF Corporation, New York, N.Y.

[22] Filed: Dec. 9, 1974

[21] Appl. No.: 531,140

[52] U.S. Cl. ................ 106/131; 106/135; 96/87 A; 96/114.2; 428/474

[51] Int. Cl.[2] ...................... C08L 89/00; G03C 1/78

[58] Field of Search ............ 106/131, 135; 96/87 A, 96/114.2; 260/404 T; 428/474

[56] References Cited

UNITED STATES PATENTS

| | | | |
|---|---|---|---|
| 2,805,161 | 9/1957 | Wood | 106/131 |
| 3,082,227 | 3/1963 | Sherr | 260/404.5 |

FOREIGN PATENTS OR APPLICATIONS

| | | |
|---|---|---|
| 645,739 | 9/1964 | Belgium |

*Primary Examiner*—Theodore Morris
*Attorney, Agent, or Firm*—Walter C. Kehm; James N. Blauvelt

[57] ABSTRACT

A photographic element or film, such as photographic or medical X-ray film, having improved antistatic and slippage properties can be prepared by applying to said element or film a protective surface containing a calcium stearate dispersion and stearamido-propyl dimethyl-beta-hydroxy-ethyl ammonium nitrate.

15 Claims, No Drawings

PHOTOGRAPHIC ELEMENT OF IMPROVED ANTISTATIC AND SLIPPAGE PROPERTIES CONTAINING CALCIUM STEARATE DISPERSION AND STEARAMIDO-PROPYL DIMETHYL-BETA-HYDROXY-ETHYL AMMONIUM NITRATE; GELATINOUS COMPOSITION, AND METHOD, FOR PREPARING SAID ELEMENT

BACKGROUND OF THE INVENTION

It has been known in general for a long time that the motivating, handling, winding, unwinding and the like operations, when applied to webbed materials, may encounter problems of friction, static, and the like. This is particularly true in handling photographic elements or films having one or more sensitized layers on one side of a photographic support and usually a backing layer on the opposite surface of said support. These problems are further heightened in the case of medical X-ray film by the fact that (1) X-ray film has two separate and independent sensitized layers on opposing surfaces of said support, and by the fact that (2) recent innovations in medical X-ray processing equipment, which have been characterized by the replacement of conventional, single sheet exposing equipment with new, rapid exposure and film transport equipment, have increased processing difficulties. Such difficulties, for example, that can be caused by the new medical X-ray processing equipment, can be static discharge on the resulting element or film product, which discharge is recorded as black spots or streaks and arises as a result of rapid transport between rubber rollers or the like. Another difficulty results from jamming of the X-ray film in such equipment if the sheets do not or will not slide smoothly from the storage area to the exposure area and then to another storage area prior to processing. As examples of such new equipment presently commercially available utilizing this new technique of rapid transport exposure are those apparatus or machines marketed by Elema-Schonander (Model DST-843-2), duPont (duPont Cronex Daylight Chest Changer Model 1000), and Picker Corporation (Picker Chest Changer, Catalog No. 750-551-1).

Previous practice for resolving or at least minimizing such problems has been the application of various additive materials such as lubricating coatings, antistatic coatings, or use of other expedients such as interleaving, etc., for facilitating handling and other operations as applied to the photographic element or film.

By means of the present invention, however, improvements in conventional photographic elements or films such as color, black-and-white, and medical X-ray film, and in their conventional methods of manufacture, are now made available which permit broadened use of such photographic elements, and, in particular, provide improved X-ray films for application in the new exposure-equipment now available to the art.

SUMMARY OF THE INVENTION

The present invention relates generally to the preparation of photographic film or elements so as to result in their having improved antistatic and slippage properties. More particularly, this invention is directed to a gelatin-containing composition, a method for preparing a photographic element or film, particularly "black-and-white", color, or medical X-ray film containing such a gelatin-coating composition as well as to the improved film products resulting from the aforementioned treatment.

In general, all of these improvements are essentially derived from the incorporation, in prescribed amounts, of (1) a dispersion of a metal salt of a high molecular weight fatty acid such as, e.g., a calcium stearate dispersion of certain properties and (2) an additive of the formula $RCONH(CH_2)_3N^+R_1R_2R_3$, $NO_3^-$, where R is $C_{7\text{-}17}$ alkyl, $R_1$ is hydroxyalkyl, and $R_2$ and $R_3$ are alkyl groups, a preferred example of such additive being stearamidopropyldimethyl-$\beta$-hydroxyethyl ammonium nitrate, into a conventional gelatin composition for application, as (a) protective surface(s), to said photographic element or film.

DESCRIPTION OF PREFERRED EMBODIMENTS

In view of the foregoing background description, it is apparent that the development of compositions that can be applied to photographic elements or film such as "black-and-white", color, or medical X-ray film, for facilitating the winding and unwinding thereof, as well as facilitating other operations that may be applied to said element or film, represent a highly desirable result long sought by those skilled in the art.

The present invention, in its most important aspect, therefore, is essentially based upon the discovery that certain chemical compounds having specifically defined properties, which compounds and properties will be described in detail hereinafter, when employed in proper proportions and otherwise in accordance with the methods of the present invention, will clearly improve the photographic elements or films in many ways, and particularly with reference to the antistatic and slippage properties thereof.

It has been found herein that certain chemical compounds, most preferably applied in combination, namely (1) aqueous dispersions of certain alkali metal, alkaline earth metal, or Group III or other metal salts of certain high molecular weight fatty acids, (hereinafter referred to as ingredient (1)) useful to enhance lubricity, having an average particle size of about 1 micron and a specific viscosity of about 350 to about 750 cps (as measured by a Brookfield LVF Viscometer, 12 rpm, No. 2 spindle) and (2) certain quaternized alkylamido (aminoalkanol) ammonium nitrates (hereinafter referred to as ingredient (2)), useful as an antistatic agent for application to paper, plastics, and textiles, can be applied, through incorporation into otherwise conventional gelatinous, protective overcoat compositions, to the backs of photographic film or either or both sensitized layer(s) of medical X-ray film so as to provide a thin surface layer thereon.

In general, it is preferred that the above-mentioned two additives be applied to the desired element or film substrate in the form of a conventional gelatin surface-coating solution, such as one derived from acid-or lime-processed gelatin. It is significant to the successful practice of this invention, however, that ingredient (2) not be added last to the gelatin surface-coating solution, otherwise such unrecommended addition will largely destroy or otherwise minimize the utility of the overall formulation with respect to its intended antistatic purposes. Indeed, addition of ingredient (2) is most preferably made as the first addition to the gelatin surface-coating solution, upon initial clarification of the freshly prepared aqueous gelatin solution, whereupon the usual and conventional coating aids, hardeners, antifoggants, couplers, stabilizers, development regulators, etc., and ingredient (1) can be thereafter added; however, it must be noted that the antistatic activity of ingredient (2) is inhibited or even destroyed if it is used with coatable amounts of certain anionic surfactants such as sodium tetradecyl sulfate (commercially available as Tergitol 4). Coatable amounts, within this context are defined as being 1 part anionic surfactant to 1.5 parts ingredient (2). Such conventional coating aids, as discussed above, are part of the prior art and are described in U.S. Pat. Nos. 2,831,766; 3,514,293; and 3,725,080. Outside of the foregoing exception, however, the order of mixing is not important to the success of this invention.

Preferably, the incorporation of ingredient (1) is effected at a concentration of 1% to 2.5% by weight, based upon the total gelatin solids content of the gelatin surface-coating composition or solution, and said ingredient is present in the gelatinous composition or solution in the form of dispersion whose suspended solids have a critical average particle size of about 1 micron, whereby at least about 90% of the particles are less than 10 microns and at least about 75% of the particles are less than 5 microns, the dispersion having a specific viscosity of about 350 to about 750 cps.

Preferably, ingredient (2) is incorporated in amounts of from about 2.5–5%, by weight, based upon the gelatin solids of said gelatin surface-coating solutions.

It is to be noted that the concentration of each ingredient (i.e., ingredients (1) and (2)) is dependent upon its satisfying a number of important requirements, viz., its being capable of: satisfactorily coating the photographic element with film coatings of adequate opacity, photosensitivity, and compatibility with the other components employed.

When the aforementioned two ingredients of the above-defined critical sizes and amounts are added in the manner described above, satisfactory results are achievable in terms of appropriate antistatic and slippage properties being imparted to the photographic element or film products. For example, no static discharge, recorded as a line of black specks of varying widths, depending upon the width of the transport wheels and contact with parts of the machine, is observed. An increase in the concentration of ingredient (1) would increase the opacity of the processed photographic or medical X-ray elements or film which would be objectionable to some consumers or users. Preferably, for the sake of economy and otherwise, it has been found suitable to operate at the lower concentrations of the two ingredients without significant alterations in the smooth transport of the photographic element or film through the automatic equipment by which it is processed.

Were the photographic element or film not to have sufficient slippage properties, such element or film would jam during the transport thereof to the exposure cycle and ruin the ultimate photograph or radiograph obtained. With respect to the processing equipment used to transport the X-ray film used to make radiographs, some equipment will only transport six sheets per second to the exposing cycle, and therefore, in such instances proper slippage of the element or film would be essential.

In general, the gelatin surface-coating solutions comprising the two essential ingredients of this invention are applicable to photographic elements or film in a number of ways of which the following are offered as illustrative examples:

1. Wringer roller: The film is passed between two rollers with adjustable pressure between them. A bead of solution is maintained between two pieces of film. The coating is applied to one side of the film only; or, in the case of medical X-ray film, to both sides of the film.

2. Dip (emersion): The film is dipped into the solution and then hung vertically to dry in the room or at higher temperatures.

3. Pouring: The film support is held while the solution is poured over one side of the support. The coated support is then hung vertically to dry at room or at higher temperatures.

4. Machine: The film passes between two rollers. The bottom roller dips into a tank of solution and carries the solution to the film. A bead of the solution is maintained between the film and the roller. A method such as this would preferably be used on larger scale operations.

However, the preferred technique and best mode of application is described in Mercier et al., U.S. Pat. No. 2,761,419, whose disclosure in this regard is hereby incorporated herein by reference.

As previously noted, essential ingredient (1) of this invention, a known material, comprises an aqueous dispersion of certain alkali metal, alkaline earth metal, Group III or other metal salts of certain high molecular weight fatty acids-preferably an aqueous calcium stearate dispersion-having an average particle size of about one micron and a specific viscosity of about 350 to about 750 cps., preferably at or about the 350 cps range, such aqueous dispersion being capable of being utilized in an aqueous gelatin solution.

In general, it is desirable that the solids content of the aqueous dispersion have as fine an average particle size as possible since this tends to promote maximum lubricating properties. Coarse particles of larger particle size than the present recommended average size of about 1 micron tend to form a paste which is difficult to handle and to lead as well to increased opacity of the final photographic element or film product.

The aqueous dispersion is characterized by being, desirably, a thin fluid that is readily pourable and pumpable with minimal foaming tendency. Additionally, it is preferably characterized by a high dispersion stability under conditions of shear and heat and by an ability to retain its fluid uniformity over an extended period of time without solidifying, thickening, agglomerating, or separating after 15 minutes or less. In addition, it must be capable of use for photographic application without harmful effect.

Suitable examples of ingredient (1) are those that satisfy the foregoing criteria, and include the $C_{12}$–$C_{32}$ fatty acid metal salts of the Group IA, IIA, and certain Group III metals such as aluminum according to the Periodic Table defined on page 628 of *Webster's Seventh New Collegiate Dictionary*, published by G. & C. Merriam Company (1971), Springfield, Massachusetts. Exemplary of such suitable materials include the Li, Na, K, Mg, Ca, Ba, Sr, and Al salts of such fatty acids as the following saturated fatty acids dodecanoic (lauric-$C_{12}$) up to and including dotriacontanoic (lacceroic-$C_{32}$). Preferred fatty acids, however, are those of lauric ($C_{12}$) to eicosanoic ($C_{20}$), most preferably stearic ($C_{18}$).

The most preferred example of ingredient (1), however, is an aqueous dispersion of finely divided calcium stearate, particularly one commercially available as Lubracal 60, a modified calcium stearate dispersion, manufactured by the Organics Division of the Witco Chemical Corporation, which has the following typical specifications:

| | |
|---|---|
| Appearance | white liquid |
| Total Active (Non-volatile) Content, % | 60 |
| pH, 5% (of product as supplied) Aqueous Dispersion | 11.5 |
| Specific Gravity at 77°F | 1.0 |
| Fineness, % through 325 mesh screen | 99.9 |
| Viscosity, at 77°F, cps | 350 |
| (Brookfield LVF, spindle No. 2, 12 rpm) | |
| Rheology | Thixotropic at all shear rates |
| Stability to Shear and Heat | 1 hour minimum |
| (Waring Blender Test, 200 gm sample) | |

As previously noted, ingredient (2), a known material, comprises certain quaternized ammonium compounds such as quaternized alkylamido (aminoalkanol) ammonium nitrates having utility as antistatic agents for application to paper, plastics, and textiles and usually available in the form of hydro-alcoholic mixtures, i.e., mixtures of ingredient (2) in an alcohol-water mixture. The quaternized ammonium compounds of utility in the practice of the present invention include, generally, those of the formula: $RCONH(CH_2)_3N^+R_1R_2R_3,NO_3^-$ where R is $C_7$–$C_{17}$ alkyl, $R_1$ is hydroxyalkyl, (preferably hydroxy $C_1$–$C_6$ lower alkyl), and $R_2$ and $R_3$ are alkyl groups, preferably $C_1$–$C_6$ alkyl. Such quaternized compounds are prepared by treating gamma-(alkylamido) alkyl amines with an alkylene oxide in dioxane, diethyl ether, or acetone, and are discussed in U.S. Pat. No. 3,082,227, whose disclosure in this regard is hereby incorporated herein by reference. Although the phosphate could possibly be of utility herein, its use nevertheless would probably be contraindicated by the likelihood of its being leached into the processing solutions employed in the practice of this invention.

In general, it is required that suitable examples of ingredient (2) that are useful in the practice of this invention be capable of satisfying certain mandatory criteria. For example, such examples must be capable of being incorporated into an aqueous gelatin solution and of coating the photographic element or film substrate, while retaining their antistatic properties. In addition, such examples have to be capable of use for photographic application without harmful effect.

Suitable examples of ingredient (2) are those that satisfy the foregoing criteria and include stearamidopropyl-dimethyl-β-hydroxyethylammonium nitrate; myristamido-methyl-methyl-β-hydroxyethylammonium nitrate; caprylamido-methyl-methyl-β-hydroxyethylammonium nitrate; abietamido-methyl-methyl-β-hydroxyethylammonium nitrate; etc.

The most preferred example of ingredient (2) is stearamidopropyldimethyl-β-hydroxyethylammonium nitrate, particularly in the form of a hydro-alcoholic mixture such as one commercially available as Catanac SN, a 50% solution of stearamidopropyldimethyl-β-hydroxyethylammonium nitrate in an isopropyl alcohol-water mixture, manufactured by the Intermediates Department of the American Cyanamid Company, Bound Brook, N.J., and which has the following typical specifications:

| | |
|---|---|
| Description | A 50% solution in aqueous isopropanol solvent mixture. Light yellow to amber in color. |
| Molecular weight (100% real) | 476 (theoretical) |
| pH | 4 to 6 |
| Compatability | Compatible in all proportions with non-ionics and other cationics. It is compatible with anionics only in specific proportions or when the reaction product is soluble. |
| Corrosiveness | Generally non-corrosive but because of its slightly acidic aqueous nature, prolonged contact with rust-susceptible metals is to be avoided. |
| Heat Stability | Differential thermal analysis indicates slight decomposition beginning at 180°C. Decomposition remains slight until temperature reach 250°C, at which point severe decomposition and appreciable discoloration occur. |
| Solubility | Miscible with water, acetone, alcohols and other polar solvents of low molecular weight. |

For a further understanding and greater appreciation of the present invention, reference may be had to the following Example which is set forth for illustrating certain of the preferred embodiments thereof. All percentage values are by weight unless stated otherwise.

EXAMPLE

A conventional silver halide, medical X-ray emulsion in gelatin containing 4% silver iodide and 96% silver bromide was prepared in a conventional manner known to the art. It was then readied for coating on film base. A 5% surface gelatin solution in water was prepared, and coating finals or aids such as spreading agents, stabilizers, hardeners, and pH adjustment agents were added. Four equal aliquot samples of the resulting surface gelatin solution were than taken one of these, to which nothing else was added, acting as a control. To one of the remaining three samples, 1.2% of Lubracal 60 (as defined hereinabove), based on the total gelatin solids content present, was added. To another of such samples, 5% of Catanac SN (as defined hereinabove), based on the total gelatin solids content present, was added. And, finally, to the last remaining sample, both 1.2% of Lubracal 60 and 5% of Catanac SN, both percentages as before being based on the total gelatin solids content present, were added. The thus-prepared emulsion and surface samples were coated on a polyester filmbase and dried. The resulting dried products were denoted as follows:

A. control material
B. Lubracal 60 (1.2%) added.
C. Catanac SN (5%) added.
D. Both Lubracal 60 (1.2%) and Catanac SN (5%) added.

The finished products (A)–(D) were then tested for slippage characteristics via a conventional "drag slippage" test, whereby there was measured the force in grams required to pull a weight across the film, the greater the force having to be applied serving as an indication of lack of slippage properties.

The results of the slippage test were as follows:

A. 200 grams
B. 160 grams
C. 180 grams
D. 160 grams

In another (and separate) test, samples of the finished products of the same composition as (A)–(D) were slit to proper size for the Elema-Schonander Medical X-ray Exposure apparatus (Model DST-843-2), and several sheets of each of the respective samples (A)–(D) run through this apparatus and processed. Inspection of the processed sheets showed the Control (A) and the Lubracal 60 (B) samples to be the only ones having objectionable static marks which could interfere with and impair diagnosis of the resulting radiograph. The Catanac SN (C) sample and the combined Lubracal 60-Catanac SN (D) sample were free of the static defect.

Additional tests were made in other equipment such as, e.g., the Picker Chest Filmer (Catalog No. 750-551-1), wherein samples of sheets of composition (A)–(D) were fed therethrough, with jamming of the apparatus occurring only with the Control (A) and with the Catanac SN-only material (C). Both the Lubracal 60 (B) material and the combined Lubracal 60-Catamac SN (D) material moved smoothly through the equipment without any jamming.

From the foregoing experimental evidence, it can be seen that only the unique combination of Lubracal 60 — Catanac SN permitted both static-free and "jam-free" Xray film performance in rapid, multi-exposing equipment.

While this invention has been described with regard to certain embodiments thereof, it is to be recognized that various modification and variations thereof will become obvious to persons skilled in the art and are to be included within the spirit and purview of this application and the scope of the appended claims.

What I claim is:

1. A gelatin-containing composition for a photographic film, comprising (a) about 1% to about 2,5% by weight, based upon the total gelatin solids content of said composition, of an aqueous dispersion of a salt of a metal selected from the group consisting of Li, Na, K, Mg, Ca, Ba, Sr, and Al and of a $C_{12}$–$C_{32}$ organic fatty acid wherein the average particle size of the solids suspended in said dispersion is about 1 micron and the specific viscosity of said dispersion is about 350 cps to about 750 cps; and (b) about 2.5 to about 5% by weight, based upon the total gelatin solids content of said composition, of a quaternary ammonium compound of the formula:

$$RCONH(CH_2)_3N{+}R_1R_2R_3.NO_3^-$$

wherein R is $C_7$–$C_{17}$ alkyl, $R_1$ is hydroxyalkyl having from 1 to 6 carbon atoms, and $R_2$ and $R_3$ are each $C_1$–$C_6$ alkyl.

2. A gelatin-containing composition according to claim 1, wherein said fatty acid is a $C_{16}$–$C_{20}$ fatty acid.

3. A gelatin-containing composition according to claim 1, wherein R is selected from the group consisting of stearyl, myristyl, capryl, and abietyl.

4. A gelatin-containing composition according to claim 1, wherein said salt is calcium stearate.

5. A gelatin-containing composition according to claim 1, wherein said quaternary ammonium compound is stearamido-propyl-dimethyl-$\beta$-hydroxyethylammonium nitrate.

6. A gelatin-containing composition according to claim 1, wherein said salt is calcium stearate and said quaternary ammonium compound is stearamido-propyl-dimethyl-$\beta$-hydroxyethylammonium nitrate.

7. A method for preparing a photographic element having improved antistatic and slippage properties thereto, comprising applying to said element a surface coating of an aqueous solution comprising a gelatin-containing composition as defined in claim 1.

8. A method for preparing a photographic element having improved antistatic and slippage properties thereto, comprising applying to said element a surface coating of an aqueous solution comprising a gelatin-containing composition as defined in claim 4.

9. A method for preparing a photographic element having improved antistatic and slippage properties thereto, comprising applying to said element a surface coating of an aqueous solution comprising a gelatin-containg composition as defined in claim 5.

10. A method for preparing a photographic element having improved antistatic and slippage properties thereto, comprising applying to said element a surface coating of an aqueous solution comprising a gelatin-containing composition as defined in claim 6.

11. A photographic element comprising a support and a light-sensitive silver halide emulsion layer having in a layer contiguous to said emulsion layer a gelatin-containing composition comprising components (a) and (b) as defined in claim 1.

12. A photographic element comprising a support and a light-sensitive silver halide emulsion layer having in a layer contiguous to said emulsion layer a gelatin-containing composition comprising a salt component therein as defined in claim 4.

13. A photographic element comprising a support and a light-sensitive silver halide emulsion layer having in a layer contiguous to said emulsion layer a gelatin-containing composition comprising a quaternary ammonium compound component as defined in claim 5.

14. A photographic element comprising a support and a light-sensitive silver halide emulsion layer having in a layer contiguous to said emulsion layer a gelatin-containing composition comprising a salt and a quaternary ammonium compound as defined in claim 6.

15. A method for preparing a gelatin-containing composition according to claim 1, comprising treating said composition with said quaternary ammonium compound.

* * * * *